United States Patent [19]

Liechti et al.

[11] Patent Number: 4,992,558
[45] Date of Patent: Feb. 12, 1991

[54] DISPERSE DYES CONTAINING A TRICYANOVINYL GROUPING BONDED TO A N,N-DISUBSTITUTED ANILINE

[75] Inventors: Peter Liechti, Arisdorf; Antoine Clément, Basel, both of Switzerland

[73] Assignee: Ciba-Geigy Corporation, Ardsley, N.Y.

[21] Appl. No.: 376,790

[22] Filed: Jul. 7, 1989

[30] Foreign Application Priority Data

Jul. 11, 1988 [CH] Switzerland ............... 2644/88

[51] Int. Cl.$^5$ ............ C09B 23/04; D06P 1/16; D06P 3/54
[52] U.S. Cl. .................... 548/477; 548/473; 558/166; 558/167; 558/403; 560/41; 560/42
[58] Field of Search ........... 558/167, 403, 166; 548/473, 478, 477; 560/41

[56] References Cited

U.S. PATENT DOCUMENTS

| | | | |
|---|---|---|---|
| 2,762,810 | 9/1956 | Heckert | 558/403 X |
| 2,889,335 | 6/1959 | Heckert | 558/403 X |
| 3,349,098 | 10/1967 | Strazey et al. | 548/477 |
| 3,476,835 | 11/1969 | Schwachhofer et al. | 558/166 |
| 3,483,218 | 12/1969 | Marrable | 548/477 |
| 3,555,016 | 1/1971 | Peter et al. | 558/403 X |
| 3,728,374 | 4/1973 | Fisher et al. | 558/403 X |
| 3,808,255 | 4/1974 | Schweizer et al. | 558/403 |
| 3,829,461 | 8/1974 | Raue et al. | 558/403 |
| 3,869,498 | 3/1975 | Ramanathan | 558/403 |
| 3,909,198 | 9/1975 | Renfrew et al. | 558/403 X |
| 4,026,914 | 5/1977 | Zirngibl | 558/403 |
| 4,088,673 | 5/1978 | Gomm et al. | 558/403 X |
| 4,123,452 | 10/1978 | Beecken | 558/403 |
| 4,231,942 | 11/1980 | Koller | 558/403 X |

FOREIGN PATENT DOCUMENTS

| | | | |
|---|---|---|---|
| 0284560 | 9/1988 | European Pat. Off. | 558/403 |
| 1245005 | 7/1967 | Fed. Rep. of Germany | 558/403 |
| 1469253 | 2/1967 | France | 558/403 |
| 45-40181 | 12/1970 | Japan | 558/403 |
| 59-230060 | 12/1984 | Japan | 558/403 |
| 60-28452 | 2/1985 | Japan | 558/403 |
| 60-194189 | 10/1985 | Japan | 558/403 |

*Primary Examiner*—Floyd D. Nigel
*Attorney, Agent, or Firm*—George R. Dohmann

[57] ABSTRACT

Novel disperse dyes particularly suitable for dyeing textile material made of polyester fibers, said dyes being of the formula

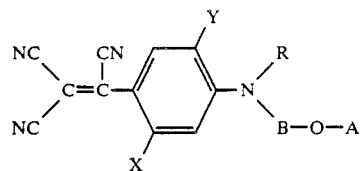

(1)

wherein
X is hydrogen, $C_1$-$C_4$alkyl, $C_1$-$C_4$alkoxy or halogen,
Y is hydrogen, halogen, $C_1$-$C_4$alkyl, $C_1$-$C_4$alkoxy, $C_1$-$C_4$alkoxy-$C_1$-$C_4$alkyl or $C_1$-$C_4$alkoxy-$C_1$-$C_4$alkoxy,
R is hydrogen, $C_1$-$C_{12}$alkyl, $C_2$-$C_{12}$alkenyl or phenyl, or Y and R, when taken together with the nitrogen atom and the two carbon atoms linking them, form a 5- or 6-membered ring,
B is straight-chain or branched $C_2$-$C_6$alkylene,
A is a radical of formula

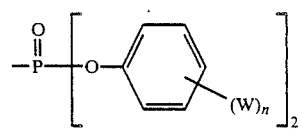

(2)

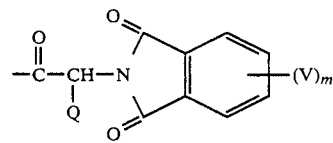

(3)

or

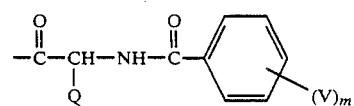

(4)

in which
W is $C_1$-$C_9$alkyl, $C_5$-$C_7$cycloalkyl, phenyl, halogen or $C_1$-$C_4$alkoxy,
n is 0, 1, 2, or 3,
Q is hydrogen or $C_1$-$C_4$alkyl,
V is halogen, and
m is 0, 1, 2, 3 or 4.

15 Claims, No Drawings

DISPERSE DYES CONTAINING A TRICYANOVINYL GROUPING BONDED TO A N,N-DISUBSTITUTED ANILINE

The present invention relates to disperse dyes, to processes for their preparation, and to the use thereof for dyeing synthetic organic material.

The dyes of this invention have the formula

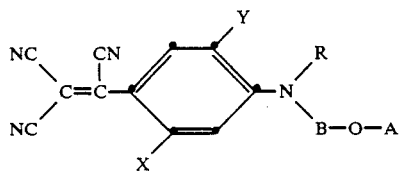

wherein
X is hydrogen, $C_1$–$C_4$alkyl, $C_1$–$C_4$alkoxy or halogen,
Y is hydrogen, halogen, $C_1$–$C_4$alkyl, $C_1$–$C_4$alkoxy, $C_1$–$C_4$alkoxy-$C_1$–$C_4$alkyl or $C_1$–$C_4$alkoxy-$C_1$–$C_4$alkoxy,
R is hydrogen, $C_1$–$C_{12}$alkyl, $C_2$–$C_{12}$alkenyl or phenyl, or Y and R, when taken together with the nitrogen atom and the two carbon atoms linking them, form a 5-or 6-membered ring,
B is a straight-chain or branched $C_2$–$C_6$alkylene radical,
A is a radical of formula

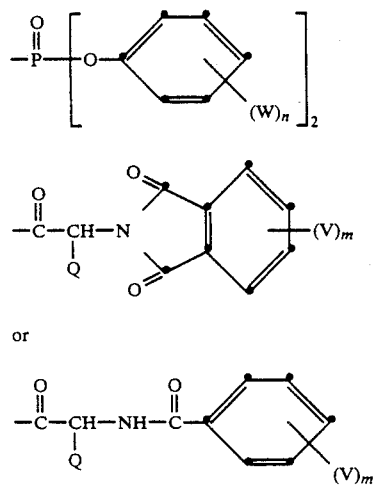

in which
W is $C_1$–$C_9$alkyl, $C_5$–$C_7$cycloalkyl, phenyl, halogen or $C_1$–$C_4$alkoxy,
n is 0, 1, 2 or 3,
Q is hydrogen or $C_1$–$C_4$alkyl,
V is halogen, and
m is 0, 1, 2, 3 or 4.

Throughout this specification, the term alkyl groups will generally be understood as meaning straight-chain, branched or cyclic alkyl groups. Such groups comprise, for example, methyl, ethyl, propyl, isopropyl, butyl, isobutyl, tert-butyl, amyl, tert-amyl (1,1-dimethylpropyl), 1,1,3,3-tetramethylbutyl, hexyl, 1-methylpentyl, neopentyl, 1-, 2- or 3-methylhexyl, heptyl, n-octyl, tert-octyl, 2-ethylhexyl, n-nonyl, isononyl, cyclopentyl, cyclohexyl, methylcyclohexyl and the associated isomers.

These alkyl radicals may be substituted, for example by hydroxy, $C_1$–$C_4$alkoxy, preferably methoxy, cyano or phenyl. Suitable further substituents are halogen such as fluoro, chloro or bromo, and —CO—U, in which U is $C_1$–$C_6$alkyl or phenyl.

Suitable alkenyl radicals are those radicals which are derived from the abovementioned alkyl radicals by replacement of at least one single bond by a double bond. Suitable radicals are, for example, ethenyl and propenyl.

Suitable alkoxy radicals are, for example, methoxy, ethoxy, propoxy, isopropoxy, n-butoxy, isobutoxy and tert-butoxy.

Examples of suitable substituted alkyl radicals are: methoxymethyl, ethoxymethyl, ethoxyethyl, ethoxypropyl, n-propoxymethyl, isopropoxymethyl, butoxymethyl, butoxyethyl, butoxypropyl, ethoxypentyl, methoxybutyl, ethoxypentyl, 2-hydroxyethoxypentyl, cyanoethyl and hydroxyethyl.

The alkylene radicals B may also be straight-chain or branched or also substituted. Suitable alkylene radicals are, for example, ethylene, 1,3-propylene, 1,2-propylene, 1,2-butylene, 1,6-hexylene, 2-hydroxy-1,3-propylene and 2-chloro-1,3-propylene.

Throughout this specification, phenyl radicals will generally be understood as meaning unsubstituted or substituted phenyl radicals. Examples of suitable substituents are $C_1$–$C_4$alkyl, $C_1$–$C_4$alkoxy, bromo, chloro, nitro and $C_1$–$C_4$alkylcarbonylamino.

Halogen throughout this specification will generally be understood as meaning fluoro, bromo and, preferably, chloro.

The preferred meanings of X are hydrogen, methyl, methoxy, chloro and bromo, hydrogen and methyl being especially preferred. Y is preferably chloro, methyl, methoxy, methoxyethyl or methoxyethoxy and, most preferably, hydrogen.

The preferred meaning of R is $C_1$–$C_4$alkyl, which may be substituted by hydroxyl, $C_1$–$C_4$alkoxy or phenyl. In particular preferred compounds of the formula (1), R is methyl, ethyl or benzyl.

R and Y, when taken together with the nitrogen atom and the two carbon atoms linking them, can form a 5- or 6-membered ring which may contain an oxygen atom as further hetero atom. Suitable substituents of these rings are, for example, hydroxyl, methyl, methoxy, chloro and phenyl. Preferably, R and Y, when taken together with the nitrogen atom and the two carbon atoms linking them, form a 6-membered ring which is unsubstituted or which carries 1 to 3 methyl groups.

B is preferably a straight-chain or branched $C_2$–$C_4$alkylene radical which can be substituted by hydroxy. Particularly preferred disperse dyes of formula (1) are those in which B is ethylene or 1,3-propylene.

Where A is a radical of formula (2), W is preferably $C_1$–$C_4$alkyl, $C_1$–$C_4$alkoxy or chloro, and n is preferably 0, 1 or 2.

Where A is a radical of formula (3) or (4), Q is preferably methyl or, most preferably, hydrogen. V is preferably chloro and m is preferably either 0 or 4.

An account of the ease with which they can be obtained, preferred dyes of formula (1) are those wherein A is a radical of formula (3) or, preferably, of formula (2).

On account of their good tinctorial properties, interesting dyes are first and foremost the dyes of formula

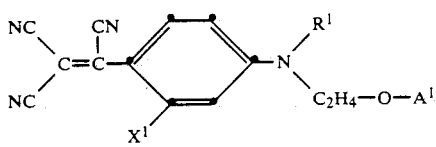

wherein
X¹ is hydrogen or methyl,
R¹ is methyl, ethyl or benzyl, and
A₁ is a radical of formula

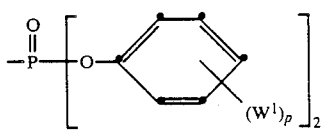

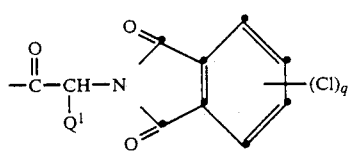

or

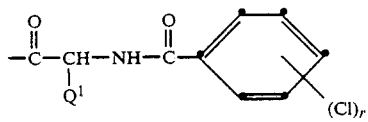

in which
W¹ is $C_1$-$C_4$alkyl or $C_1$-$C_4$alkoxy or chloro,
p is 0, 1 or 2,
Q¹ is methyl or, preferably, hydrogen,
q is 0 or 4, and
r is 0, 1 or 2.

The compounds of formula (1) are prepared in a manner known per se, for example by reacting a compound of formula

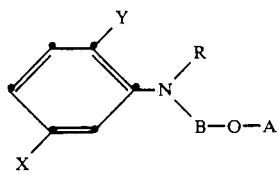

with tetracyanoethylene, or by reacting a compound of formula

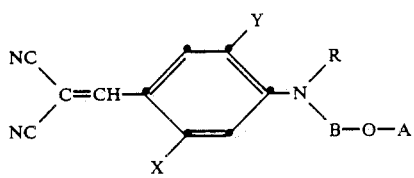

with a cyanide and then with an oxidising agent.

The compounds of formulae (9) and (10) are novel and constitute further objects of the invention. They can be obtained in a manner known per se.

The compounds of formula (9) can be obtained, for example, by reacting a compound of formula Hal—B—O—A  (11)

with an aniline derivative of the formula

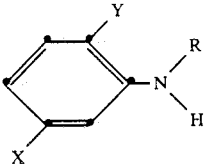

the compound of formula (11) being obtained, for example, by reacting a compound of formula

H—O—A  (13)

or a compound of formula

Hal—A  (16)

with a compound of formula

Hal—B—OH  (14).

The compounds of formula (9) can also be obtained by reacting a compound of formula

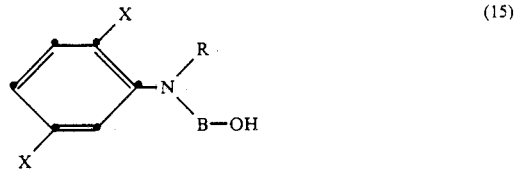

with a compound of formula

Hal—A  (16)

in a manner which is known per se.

The compounds of formulae (15) and (16) are known or can be prepared in a manner which is known per se.

In formulae (9) to (16), A, B, X, Y and R are as defined for formula (1) and Hal is chloro or bromo.

The compounds of formulae (11), (12), (13) and (14) are also known or can be prepared in a manner which is known per se.

The reaction of compound (13) or (16) with compound (14) is carried out by known methods of esterification, with or without the addition of customary solvents therefor. Components (13) and (14) or (13) and (16) may be used in stoichiometric proportion, but an excess of one of the components, preferably compound (14) or (16), is often more advantageous.

The reaction temperature is in the range from about 80° to 150° C., preferably from 100° to 130° C., and the reaction time is from about 1 hour to 20 hours, depending on the temperature and the reactants. When the reaction is complete, component (14), which may have been used in excess, is removed, and the resultant compound of formula (11) is then reacted with an aniline derivative of formula (12). This reaction too is preferably carried out in one of the abovementioned solvents. The temperature is normally above 100° C., preferably in the range from 120° to 200° C., most preferably from 140° to 180° C.

Components (11) and (12) may be used in stoichiometric proportion, although normally an excess of the more readily accessible component, usually the aniline derivative (12), will be used, for example an excess of 10%.

Upon completion of the reaction, the reaction mixture is worked up in conventional manner, for example by removing the excess of component (12) and the solvent and purifying the residue if necessary, for example by recrystallisation.

The reaction of compounds (16) and (14) as well as the reaction of compounds (11) and (12) are carried out in the presence of a base. Suitable bases are organic as well as inorganic bases, for example pyridine, piperidine, triethylamine, sodium carbonate, potassium carbonate, sodium hydrogencarbonate or potassium hydrogencarbonate. A small excess of this base is normally used, for example an excess of 10%.

The entire synthesis of compound (9) can also be carried out as a one-pot reaction by using the same solvent for both reaction steps and not isolating compound (11).

The preferred method of preparing the compound of formula (10) comprises converting a compound of formula

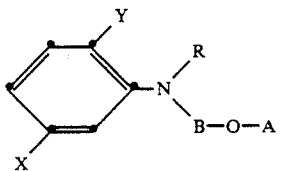

(9)

first into the aldehyde of formula

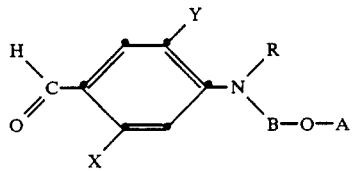

(17)

and then reacting said aldehyde with malodinitrile to give a compound of formula (10).

The conversion of compound (9) into an aldehyde of formula (17) is carried out, for example, under the known conditions of the Vilsmeier synthesis, for example with phosphoryl chloride and dimethyl formamide or N-methylformanilide, or with phosgene and dimethyl formamide.

The condensation of the aldehyde of formula (17) with malodinitrile is also carried out under reaction conditions which are known per se, for example in the temperature range from ca. 20° to 100° C. in an organic solvent, for example an aliphatic alcohol, and in the presence of a catalyst such as piperidine. The resultant compound of formula (10) is subsequently reacted with a cyanide in a manner known per se and then with an oxidising agent.

These reactions are preferably carried out as a one-pot reaction, i.e. without isolation of the intermediate (10), and also in an inert solvent. The preferred cyanide is potassium or sodium cyanide and the preferred oxidising agent is bromine. The reaction with the cyanide is preferably carried out in the temperature range from ca. 20° to 100° C., and the reaction with the oxidising agent from ca. 0° to 20° C.

The reaction of compounds of formula (9) with tetracyanoethylene is also carried out in a manner known per se, preferably in an inert solvent at a temperature in the range from ca. 20° to 100° C., in which reaction the reaction components are used in about equivalent amounts.

Examples of suitable inert solvents for the above reactions are halogen compounds such as chloroform or chlorobenzene, ethers, aromatic compounds such as benzene, toluene or xylene, but preferably tetrahydrofuran of dimethylformamide.

The dyes of the formula (1) are isolated, for example, by pouring the reaction solutions into ice-water, whereupon the precipitated dye is isolated by filtration and, if desired, washed and dried.

The compounds of formula (1) may be used as dyes for dyeing and printing cellulosic and, preferably, synthetic hydrophobic fibre materials, in particular textile materials. Textile materials composed of blends which contain such cellulosic or synthetic hydrophobic textile materials can likewise be dyed or printed with the compounds of the invention.

Suitable cellulosic textile materials are in particular cellulose 2½-acetate and cellulose triacetate.

Synthetic hydrophobic textile materials consist in particular of linear, aromatic polyesters, for example those from terephthalic acid and glycols, in particular ethylene glycol or condensation products of terephthalic acid and 1,4-bis(hydroxymethyl)cyclohexane, or polycarbonates, for example those from $\alpha,\alpha$-dimethyl-4,4'-dihydroxy-diphenylmethane and phosgene, or polyvinyl chloride and polyamide fibres.

The compounds of the invention are applied to the textile materials by known dyeing methods. For example, polyester fibre materials are dyed from an aqueous dispersion by the exhaust process in the presence of customary anionic or nonionic dispersants and in the presence or absence of customary swelling agents (carriers) at temperatures from 80° to 140° C. Cellulose 2½-acetate is preferably dyed in the temperature range from about 65° to 85° C., and cellulose triacetate at temperatures up to 115° C.

The novel dyes produce little or no staining on wool and cotton simultaneously present in the dyebath (very good resist), so that they can also be readily used for dyeing polyester/wool and polyester/cellulose blends.

However, the dyes of this invention are particularly suitable for dyeing by the thermosol process.

The textile material may be in any form of presentation, for example as fibre, yarn or nonwoven fabric or as woven or knitted fabric.

It is advantageous to convent the dyes of this invention before use into a dye formulation. This is done by grinding the dye to an average particle size of 0.01 to 10 microns. The grinding can be carried out in the presence of dispersants. For example, the dried dye is ground together with a dispersant or kneaded in paste form together with a dispersant and then dried under vacuum or by spray drying. Printing pastes and dye baths can be prepared by adding water to the formulations so obtained.

For printing, the customary thickeners are used, for example modified or unmodified natural products, for example alginates, British gum, gum arabic, crystal gum, locust bean ether gum, tragacanth, carboxymethylcellulose, hydroxyethylcellulose, starch or synthetic products, for example polyacrylamide, polyacrylic acid or copolymers thereof or polyvinyl alcohols.

The dyes of this invention produce on the cited materials, in particular on polyester material, level orange or red shades of very good wear fastness properties, in particular good lightfastness, fastness to heat setting, fastness to pleating, fastness to chlorine, and wetfastness properties such as fastness to water, perspiration and washing. The dyeings are further distinguished by good pH stability and very good rub fastness. Dyeings of very high tinctorial strength are also obtained. The good fastness of the dyeings to thermomigration is to be singled out for special mention.

The dyes of this invention may also be readily used for producing mixed shades together with other dyes. It is, of course, also possible to use mixtures of the dyes of this invention with one another.

The present invention also relates to the aforementioned use of the azo compounds of formula (1) as well as to a process for dyeing or printing cellulosic or synthetic hydrophobic fibre material, in particular textile material, which process comprises applying to, or incorporating in, the cited material one or more compounds of formula (1). The hydrophobic fibre material is preferably polyester textile material. Further substrates which can be treated by the process of the invention and preferred process conditions have been mentioned above in the more detailed description of the use of the compounds of formula (1).

The present invention further relates to the hydrophobic fibre material, preferably polyester textile material, dyed or printed by the above process.

The following non-limitative Examples illustrate the invention in more detail. Parts and percentages are by weight, unless otherwise stated.

EXAMPLE 1

To a solution of 5 g of N-ethyl-N-(2-hydroxyethyl)aniline in 18 ml of pyridine are added, over 3 minutes, 8 g of crude 2-phthalimidoacetyl chloride which has been freshly prepared by reacting phthalimidoacetic acid with thionyl chloride in toluene, using dimethyl formamide as catalyst, and isolated by concentrating the reaction mixture. During this addition, the temperature rises to 50° C. After stirring for 3 hours at 60°-65° C., a further 3 g of phthalimidoacetyl chloride are added and the reaction is allowed to continue for 2 hours. The reaction mixture is taken up in 300 ml of ethyl acetate, washed with three 200 ml portions of water, dried over sodium sulfate and concentrated by evaporation, to give ca. 15 g of a yellowish brown oil which contains ca. 70% of the compound of formula

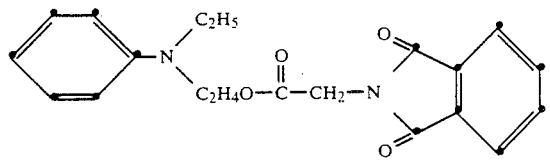

5.0 g of the above compound are dissolved in 12 ml of pyridine and 1.4 g of tetracyanoethylene are added to the solution, whereupon the reaction mixture exotherms to 35° C. After 3 hours, the red solution is mixed with 10 ml of glacial acetic acid, with cooling, and then charged to 150 ml of ice-water and 50 ml of ethanol. After stirring for 30 minutes at 0°-5° C., the precipitate is isolated by filtration, washed with water and dried at 60° C. under vacuum, to give 5.3 g of the crude compound of formula

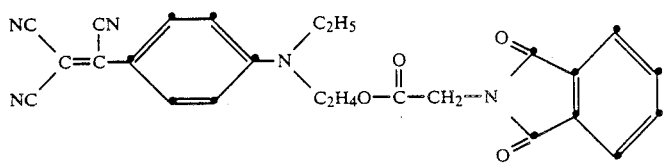

in the form of a reddish brown powder. Chromatography over silica gel with ethyl acetate as eluant gives 1.58 g of the pure dye as a reddish brown fine crystalline powder which melts at 160°-161° C.

EXAMPLE 2

3.7 g of N-ethyl-N-phthalimidoacetoxyethyl aniline, the preparation of which is described in Example 1, are dissolved in 3.8 ml of dimethyl formamide and to this solution are added 4.6 g of phosphoroxy chloride, with cooling, over 10 minutes. The reaction mixture is stirred for 4 hours at 50° C. and then charged to 20 ml of ice-water and 2.5 ml of 30% sodium hydroxide solution, while maintaining a maximum temperature of 30° C. The mixture is further decomposed by addition of 9 ml of 30% sodium hydroxide solution. The oily precipitate of the aldehyde of formula

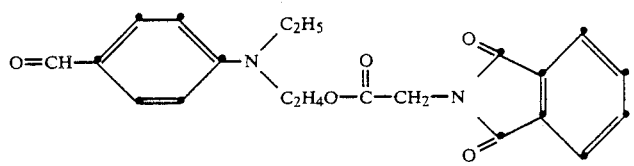

is extracted with 50 ml of ethyl acetate and the extract is washed with water until neutral, dried over sodium sulfate and concentrated by evaporation.

The 3.4 g of the yellowish brown oil so obtained are dissolved in 25 ml of methanol and reacted with 0.7 g of malodinitrile for 45 minutes at 40°-50° C. in the presence of 0.09 g of piperidine. The reaction mixture is cooled to 5° C. and the precipitate is isolated by filtration, washed with cold methanol and dried, to give the yellow dye of formula

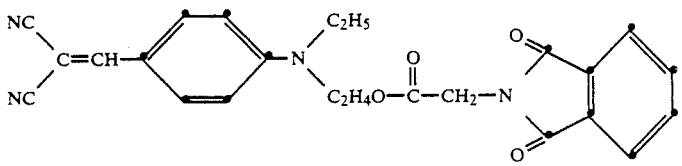

yield: 2.15 g of a yellowish brown powder which melts at 171°–172° C.

The above dicyanovinyl dye is dissolved in 10 ml of dimethyl formamide and 10 ml of methanol. Then 0.26 g of sodium cyanide in 0.6 ml of water is added at 60° C., and the red solution is added dropwise at 10°–15° C. over 2 hours simultaneously with 1.2 g of bromine to a solution of 0.5 g of anhydrous sodium acetate and 0.05 g of bromine in 5 ml of methanol. After precipitation with 10 ml of ice-water, the product is collected by suction filtration, washed with water and dried, affording 1.4 g of a reddish brown powder which melts at 150°–154° C. Thin-layer chromatography shows the product to be a somewhat impurer form of the dye obtained in Example 1.

EXAMPLE 3

The procedure described in Example 1 is repeated, replacing the phthalimidoacetyl chloride by the equivalent amount of hippuryl chloride (benzoylamidoacetyl chloride), to give the dye of formula

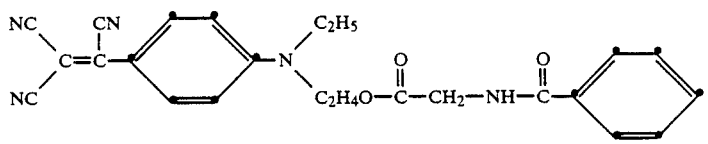

via the corresponding intermediate, which is also not purified, as a reddish brown powder in a yield of 4.28 g. After recrystallisation from methylene chloride the dyestuff melts at 142°–144° C.

EXAMPLE 4

13.2 g of N-ethyl-N-(2-hydroxyethyl)aniline are dissolved in 48 ml of pyridine and to this solution are added 26 g of diphenyl phosphorochloridate at 15°–20° C. over 20 minutes. The reaction mixture is stirred for 1 hour at room temperature and then taken up in ethyl acetate, washed twice with water, dried over sodium sulfate and concentrated by evaporation, to give 32.4 g of the compound of formula

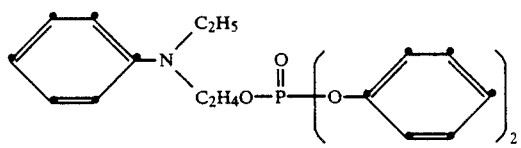

as a yellowish brown oil.

8.0 g of this oil are dissolved in 7.2 g of dimethyl formamide and to this solution are added 4.6 g of phosphoroxy chloride over 10 minutes, while maintaining a maximum temperature of 45° C. Working up as described in Example 2 gives 7.0 g of the aldehyde of formula

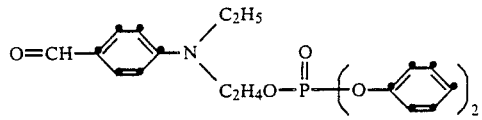

as a yellowish brown oil. 3.0 g of this oil are further reacted with malodinitrile as described in Example 2 to give 3.5 g of the amorphous yellow dicyanovinyl dye of formula

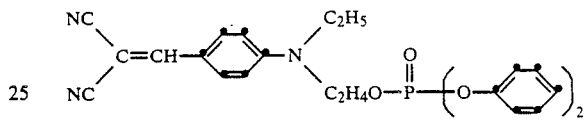

from which, by reaction with sodium cyanide and bromine as described in Example 2, but without purification by chromatography, the red dye of formula

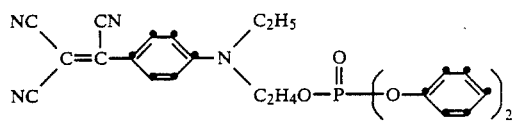

is obtained as a reddish brown powder with a melting point of 132°–134° C.

The same dye (m.p. 133°–134° C., likewise without purification by chromatography) is obtained by reacting N-ethyl-N-diphenoxyphosphoryloxyethyl aniline with tetracyanoethylene as described in Examples 1 and 3.

EXAMPLE 5

The procedure described in Example 4 is repeated, replacing the diphenyl phosphorochloridate by the equivalent amount of di-2-methylphenol phosphorochloridate to give the dye of formula

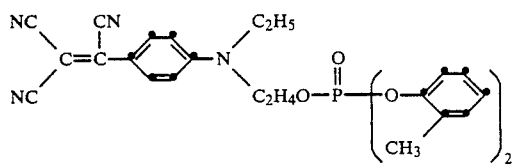

(m.p. 105–106° C.)

which dyes polyester textile material in red shades of good fastness properties.

EXAMPLE 6

The procedure described in Example 4 is repeated, replacing diphenyl phosphorochloridate by the equivalent amount of di-4-chlorophenol phosphorochloridate, to give the dye of formula

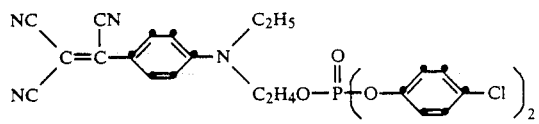

(m.p. 129–130° C.)

which dyes polyester textile material in red shades of good fastness properties.

EXAMPLE 7

The procedure of Example 1 is repeated, replacing N-ethyl-N-(2-hydroxyethyl)aniline by an equivalent amount of the tetrahydroquinoline of formula

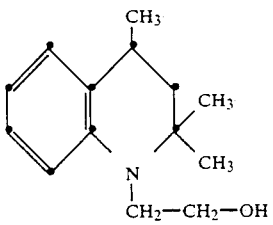

to give the dye of formula

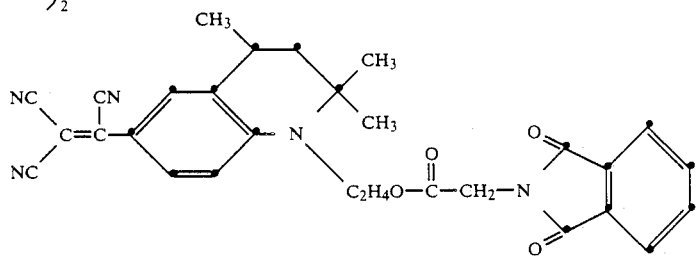

which dyes polyester textile material in red shades.

EXAMPLE 8

The procedure of Example 3 is repeated, replacing N-ethyl-N-(2-hydroxyethyl)aniline by an equivalent amount of the tetrahydroquinoline used in Example 7, to give the dye of formula

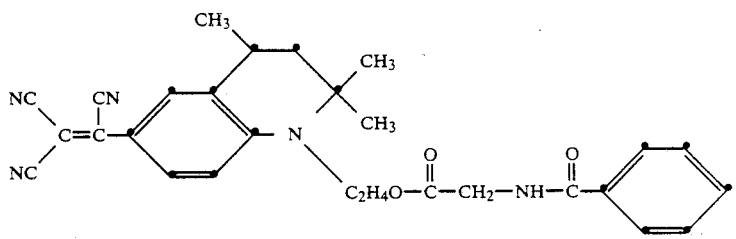

which dyes polyester textile material in red shades.

EXAMPLE 9

The procedure of Example 4 is repeated, replacing N-ethyl-N-(2-hydroxyethyl)aniline by an equivalent amount of the tetrahydroquinoline used in Example 7, to give the dye of formula

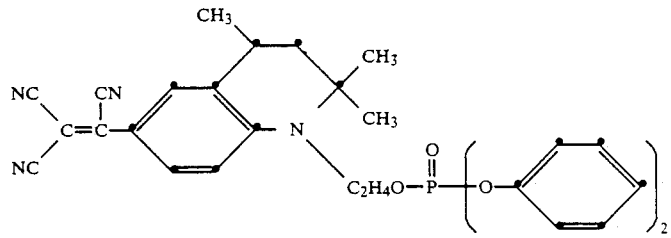

which dyes polyester textile material in red shades.

EXAMPLES 10–36

In accordance with the procedures described in Examples 1 to 6, it is also possible to prepare the dyes listed in the following Table:

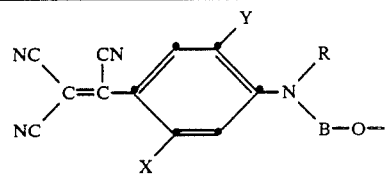

| Example | X | Y | R | B | A | Shade on PEL |
|---|---|---|---|---|---|---|
| 10 | H | H | —C$_2$H$_5$ | —(CH$_2$)$_3$— | —C(O)—CH$_2$—NH—C(O)—C$_6$H$_5$ | red |
| 11 | CH$_3$ | H | —C$_2$H$_5$ | —(CH$_2$)$_3$— | —C(O)—CH$_2$—NH—C(O)—C$_6$H$_5$ | ruby |
| 12 | H | H | —C$_2$H$_5$ | —(CH$_2$)$_3$— | —C(O)—CH$_2$—N(phthalimide) | red |
| 13 | H | H | —(CH$_2$)$_2$CH$_3$ | —(CH$_2$)$_2$— | —C(O)—CH$_2$—N(phthalimide) | red |
| 14 | H | H | —CH$_3$ | —(CH$_2$)$_6$— | —P(O)(O—C$_6$H$_5$)$_2$ | red |
| 15 | CH$_3$ | H | —CH$_3$ | —(CH$_2$)$_6$— | —P(O)(O—C$_6$H$_5$)$_2$ | ruby |
| 16 | H | Cl | —C$_2$H$_5$ | —(CH$_2$)$_2$— | —P(O)(O—C$_6$H$_5$)$_2$ | red |
| 17 | H | H | —C$_2$H$_5$ | —CH$_2$—CH(CH$_3$)— | —P(O)(O—C$_6$H$_5$)$_2$ | red |
| 18 | H | H | —C$_2$H$_5$ | —CH(CH$_3$)—CH$_2$— | —P(O)(O—C$_6$H$_5$)$_2$ | red |
| 19 | Cl | H | —C$_2$H$_5$ | —(CH$_2$)$_2$— | —P(O)(O—C$_6$H$_5$)$_2$ | red |

-continued

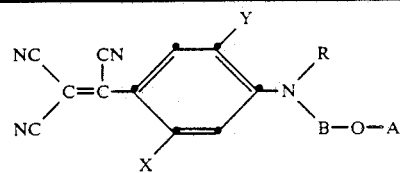

| Example | X | Y | R | B | A | Shade on PEL |
|---|---|---|---|---|---|---|
| 20 | H | H | —CH$_3$ | —(CH$_2$)$_2$— | $-\overset{\underset{\|}{O}}{P}(-O-\langle\text{C}_6\text{H}_4\rangle-\text{Cl})_2$ | red |
| 21 | H | H | —CH$_3$ | —(CH$_2$)$_2$— | $-\overset{\underset{\|}{O}}{C}-CH_2-N$(tetrachlorophthalimide) | red |
| 22 | H | H | —C$_2$H$_5$ | —(CH$_2$)$_2$— | $-\overset{\underset{\|}{O}}{C}-CH_2-N$(trichlorophthalimide) | red |
| 23 | H | H | —C$_2$H$_5$ | —(CH$_2$)$_2$— | $-\overset{\underset{\|}{O}}{C}-CH_2-NH-\overset{\underset{\|}{O}}{C}-\langle\text{C}_6\text{H}_4\rangle-\text{Cl}$ (4-Cl) | red |
| 24 | H | H | —CH$_3$ | —(CH$_2$)$_2$— | $-\overset{\underset{\|}{O}}{C}-CH_2-NH-\overset{\underset{\|}{O}}{C}-\langle\text{C}_6\text{H}_3\rangle(2,4\text{-Cl}_2)$ | red |
| 25 | H | H | —CH$_2$—C$_6$H$_5$ | —(CH$_2$)$_6$— | $-\overset{\underset{\|}{O}}{P}(-O-\langle\text{C}_6\text{H}_4\rangle)_2$ | red |
| 26 | H | H | —C$_2$H$_5$ | —C$_2$H$_4$— | $-\overset{\underset{\|}{O}}{C}-\overset{\underset{\|}{CH_3}}{CH}-NH-\overset{\underset{\|}{O}}{C}-\text{C}_6\text{H}_5$ | red |
| 27 | H | H | —C$_2$H$_5$ | —C$_2$H$_4$— | $-\overset{\underset{\|}{O}}{P}(-O-\langle\text{C}_6\text{H}_4\rangle(OCH_3))_2$ | red |
| 28 | H | H | —C$_2$H$_5$ | —C$_2$H$_4$— | $-\overset{\underset{\|}{O}}{C}-\overset{\underset{\|}{CH_3}}{CH}-N$(phthalimide) | red |

-continued

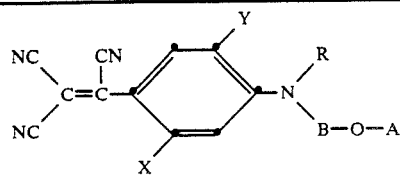

| Example | X | Y | R | B | A | Shade on PEL |
|---|---|---|---|---|---|---|
| 29 | H | H | $-C_2H_5$ | $-C_2H_4-$ | $-\overset{O}{\underset{\parallel}{P}}\left\{O-\phenyl-OCH_3\right\}_2$ | red |
| 30 | H | H | $-C_2H_5$ | $-C_2H_4-$ | $-\overset{O}{\underset{\parallel}{P}}\left\{O-\phenyl-C(CH_3)_3\right\}_2$ | red |
| 31 | H | H | $-C_2H_5$ | $-C_2H_4-$ | $-\overset{O}{\underset{\parallel}{P}}\left\{O-\phenyl(Cl)\right\}_2$ | red |
| 32 | H | H | $-CH_3$ | $-C_2H_4-$ | $-\overset{O}{\underset{\parallel}{P}}\left\{O-\phenyl(Cl,Cl)\right\}_2$ | red |
| 33 | H | H | $-CH_3$ | $-C_2H_4-$ | $-\overset{O}{\underset{\parallel}{P}}\left\{O-\phenyl(Cl,Cl,Cl)\right\}_2$ | red |
| 34 | H | H | $-CH_3$ | $-C_2H_4-$ | $-\overset{O}{\underset{\parallel}{P}}\left\{O-\phenyl(CH_3,CH_3,CH_3)\right\}_2$ | red |
| 35 | H | H | $-CH_3$ | $-C_2H_4-$ | $-\overset{O}{\underset{\parallel}{P}}\left\{O-\phenyl-CH(CH_3)_2\right\}_2$ | red |
| 36 | H | H | $-CH_3$ | $-C_2H_4-$ | $-\overset{O}{\underset{\parallel}{P}}\left\{O-\phenyl-cyclohexyl\right\}_2$ | red |

EXAMPLE 37

1 part of the dry, uncut dye of Example 1 is mixed in a sand mill together with 2 parts of dinaphthylmethane disulfonate (sodium salt), 34 parts of quartz sand and 17 parts of water, and the mixture is ground to a particle size of about 2μ or less. The resultant suspension is separated from the sand to leave a stable liquid formulation. However, the suspension can also be subjected to spray drying, in which case a dye formulation in powder form is obtained.

In the same way it is also possible to produce stable liquid and solid formulations of the dyes of Examples 2–6.

EXAMPLE 38

Polyethylene terephthalate fabric is impregnated on a pad at 40° C. with a liquor of the following composition:
20 parts of the dye formulation obtained as described in Example 37, finely dispersed in
10 parts of sodium alginate,
20 parts of octylphenol polyglycol ether and
930 parts of water.

The fabric is expressed to about 60% pick-up, dried at 100° C. and then heat set at a temperature of 210° C. for 60 seconds. The dyed fabric is washed with water, soaped off or reduction-cleared and dried. A brilliant, lightfast red dyeing which is distinguished in particular by good fastness to thermomigration is obtained.

EXAMPLE 39

2 parts of the dye formulation obtained according to Example 37 are dispersed in 4000 parts of water containing 12 parts of the sodium salt of o-phenylphenol, 2 parts of ammonium sulfate and 2 parts of sodium dinaphthylmethane disulfonate. 100 parts of polyethylene terphthalate yarn are then dyed at 95° to 98° C. for 90 minutes in this liquor.

The dyeing is subsequently rinsed and aftertreated with aqueous sodium hydroxide solution and a dispersant, to give a red dyeing which is fast to light and sublimation.

EXAMPLE 40

1 part of the dye obtained according to Example 4 is ground wet together with 2 parts of a 50% aqueous solution of sodium dinaphthylmethane disulfonate, and the milled material is dried.

This dye formulation is stirred with 40 parts of a 10% aqueous solution of sodium N-benzylheptadecylbenzimidazole disulfonate and 4 parts of a 40% solution of acetic acid are added. A dyebath is prepared therefrom by dilution with water to 4000 parts.

100 parts of a polyester fibre material are then put into this bath at 50° C., the temperature is raised to 120° to 130° C. over half an hour, and dyeing is carrried out at this temperatur in a sealed vessel for one hour. The dyed goods are thoroughly rinsed. The red dyeing so obtained has good fastness properties, in particular good fastness to sublimation and thermomigration.

What is claimed is:

1. A disperse dye of formula

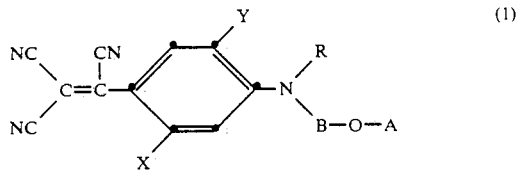

wherein
X is hydrogen, $C_1$–$C_4$alkyl, $C_1$–$C_4$alkoxy or halogen,
Y is hydrogen, halogen, $C_1$–$C_4$alkyl, $C_1$–$C_4$alkoxy-$C_1$–$C_4$alkyl or $C_1$–$C_4$alkoxy-$C_1$–$C_4$alkoxy,
R is hydrogen, $C_1$–$C_{12}$alkyl, $C_2$–$C_{12}$alkenyl or phenyl, or Y and R, when taken together with the nitrogen atom and the two carbon atoms linking them, form a 5- or 6-membered ring,
B is straight-chain or branched $C_2$–$C_6$alkylene,
A is a radical of formula

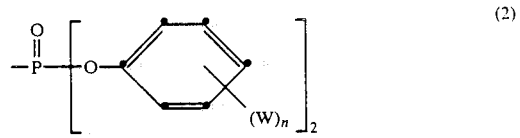

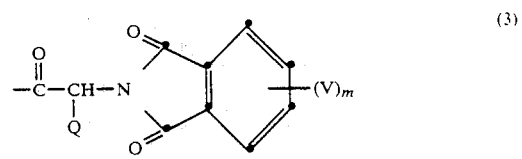

or

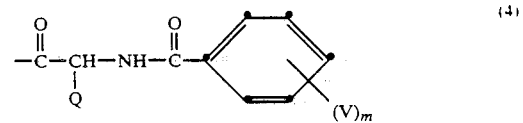

in which
W is $C_1$–$C_9$alkyl, $C_5$–$C_7$cycloalkyl, phenyl, halogen or $C_1$–$C_4$alkoxy,
n is 0, 1, 2 or 3,
Q is hydrogen or $C_1$–$C_4$alkyl,
V is halogen, and
m is 0, 1, 2, 3 or 4.

2. A dye according to claim 1, wherein X is hydrogen, methyl, methoxy, chloro or bromo.

3. A dye according to claim 2, wherein X is hydrogen or methyl.

4. A dye according to claim 1, wherein Y is hydrogen, chloro, methyl, methoxy, methoxyethyl or methoxyethoxy.

5. A dye according to claim 4, wherein Y is hydrogen.

6. A dye according to claim 1, wherein R is $C_1$–$C_4$alkyl which is unsubstituted or substituted by hydroxyl, $C_1$–$C_4$alkoxy or phenyl.

7. A dye according to claim 6, wherein R is methyl, ethyl or benzyl.

8. A dye according to claim 1, in which R and Y, when taken together with the nitrogen atom and the two carbon atoms linking them, form a 6-membered ring which is unsubstituted or carries 1 to 3 methyl groups.

9. A dye according to claim 1, wherein B is unsubstituted or substituted by hydroxy.

10. A dye according to claim 9, wherein B is ethylene or 1,3-propylene.

11. A dye according to claim 1, wherein A is a radical of formula (3).

12. A dye of formula

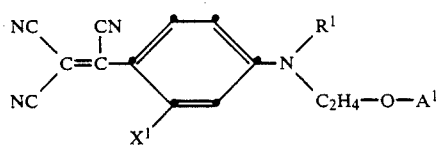
(5)

wherein $X^1$ is hydrogen or methyl,
$R^1$ is methyl, ethyl or benzyl, and
$A^1$ is a radical of formula

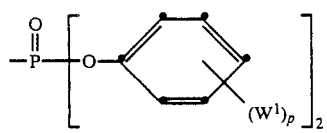
(6)

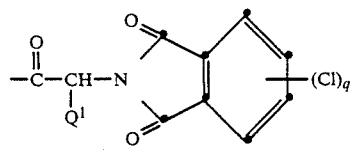
(7)

or

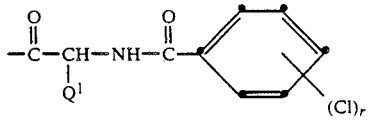
(8)

in which
$W^1$ is $C_1$-$C_4$alkyl or $C_1$-$C_4$alkoxy or chloro,
p is 0, 1 or 2,
$Q^1$ is methyl or hydrogen,
q is 0 or 4, and
r is 0, 1 or 2.

13. A dye according to claim 1, wherein A is a radical of formula (2).

14. A compound of formula

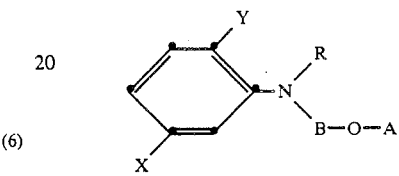
(9)

wherein X, Y, R, B and A are as defined in claim 1.

15. A compound of formula

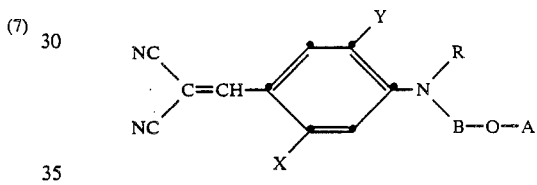
(10)

wherein X, Y, R, B and A are as defined in claim 1.

* * * * *